United States Patent [19]

Bloomfield et al.

[11] Patent Number: 6,143,159

[45] Date of Patent: Nov. 7, 2000

[54] ELECTROCHEMICAL AUTOTHERMAL REFORMER

[75] Inventors: David P. Bloomfield, Boston; Arthur N. Rabe, North Quincy, both of Mass.

[73] Assignee: Niagara Mohawk Power Corporation, Syracuse, N.Y.

[21] Appl. No.: 09/316,056

[22] Filed: May 21, 1999

Related U.S. Application Data

[62] Division of application No. 08/892,979, Sep. 15, 1997, Pat. No. 5,965,010.

[51] Int. Cl.$^7$ ........................................................ C10J 3/68
[52] U.S. Cl. ............................ 205/265; 205/266; 205/295; 96/11
[58] Field of Search ............................ 204/265, 266, 204/295; 96/11

[56] References Cited

U.S. PATENT DOCUMENTS

| | | |
|---|---|---|
| 3,148,089 | 9/1964 | Oswin . |
| 3,296,449 | 1/1967 | Plust et al. . |
| 3,407,094 | 10/1968 | Juda . |
| 3,449,168 | 6/1969 | Sederquist . |
| 3,450,567 | 6/1969 | Sederquist et al. . |
| 3,544,374 | 12/1970 | Lessandro et al. . |
| 3,544,376 | 12/1970 | Connor, Jr. et al. . |
| 3,616,334 | 10/1971 | Aker et al. . |
| 3,972,731 | 8/1976 | Bloomfield et al. . |
| 3,976,507 | 8/1976 | Bloomfield . |
| 4,004,947 | 1/1977 | Bloomfield . |
| 4,081,337 | 3/1978 | Spitzer . |
| 4,167,457 | 9/1979 | Giner . |
| 4,288,301 | 9/1981 | Hart . |
| 4,314,984 | 2/1982 | Lawson et al. . |
| 4,391,682 | 7/1983 | Struck et al. . |
| 4,412,895 | 11/1983 | Lu . |
| 4,532,192 | 7/1985 | Baker et al. . |
| 4,620,914 | 11/1986 | Abens et al. . |
| 4,810,485 | 3/1989 | Marianowski et al. . |
| 4,911,803 | 3/1990 | Kunz . |
| 5,019,227 | 5/1991 | White et al. . |
| 5,141,604 | 8/1992 | Ayers . |
| 5,149,600 | 9/1992 | Yamase et al. . |
| 5,478,444 | 12/1995 | Liu et al. . |
| 5,997,594 | 12/1999 | Edlund et al. ........................ 48/76 |

*Primary Examiner*—Arun S. Phasge
*Attorney, Agent, or Firm*—Wall Marjama & Bilinski

[57] ABSTRACT

An electrochemical autothermal reformer (EATR) provides hydrogen. The EATR includes an autothermal reformer region, a reformer anode supply region, and a composite membrane layer separating the reformer anode from the autothermal reformer region. The composite membrane layer includes a mechanically stable porous ceramic support member with a thin gas permeable ceramic substrate layer overlaying the support member. Overlaying the substrate layer is a first thin metallic catalyst layer which promotes the dissociation of $H_2$ to $2H^+ + 2e^{31}$. Overlaying the first catalyst layer is a metallic oxide layer capable of conducting $2H^+ + 2e^-$ at elevated temperatures. Overlaying the metallic oxide layer is a second thin metallic catalyst layer which promotes the recombination of $2H^+ + 2e^{31}$ to $H_2$.

1 Claim, 2 Drawing Sheets

ELECTROCHEMICAL AUTOTHERMAL REFORMER

This is a divisional application of U.S. Ser. No. 08/892,979, filed Jul. 15, 1997, the entirety of which is incorporated herein by reference now U.S. Pat. No. 5,965,010.

BACKGROUND OF THE INVENTION

This invention relates to a reformer that processes a hydrocarbon fuel to separate and provide hydrogen from the hydrocarbon fuel, and in particular, to a composite membrane for an electrochemical autothermal reformer (EATR).

A "reformer" is a known device for converting hydrocarbon fuels to hydrogen, in which a hydrocarbon fuel is mixed with air and with or without steam to convert the mixture to hydrogen, carbon monoxide, carbon dioxide, water, and impurities. An autothermal reformer uses fuel, air, and steam. Since most known reformers are adversely sensitive to the presence of impurities, impurities such as sulphur are generally removed from the fuel before entering the reformer. An electrochemical autothermal reformer combines the principles of electrochemical hydrogen separation with those of an autothermal reformer. The purpose of the electrochemical autothermal reformer is to effect the removal of hydrogen produced from the reaction zone of the reformer so as to drive the reforming reaction to completion by separating or selectively extracting the hydrogen component from the rest of the product mixture.

For example, the principal reactions in a natural gas or "methane" reformer such as an autothermal reformer are:

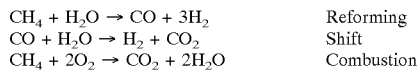

| | |
|---|---|
| $CH_4 + H_2O \rightarrow CO + 3H_2$ | Reforming |
| $CO + H_2O \rightarrow H_2 + CO_2$ | Shift |
| $CH_4 + 2O_2 \rightarrow CO_2 + 2H_2O$ | Combustion |

In an autothermal reformer, the exothermic combustion reaction is used to drive the endothermic reforming reaction. The shift reaction is mildly exothermic. If hydrogen is abstracted or removed from the reaction zone of the autothermal reformer, then by LeChatelier's principle, the reforming and shift reactions are driven to completion. Accordingly, the fuel processing in an EATR is greatly simplified since shift converters and selective oxidizers are not required downstream from the fuel processor.

Marianowski et al. (U.S. Pat. No. 4,810,485) teaches a hydrogen forming process and apparatus wherein one side of a hydrogen ion porous and molecular gas non-porous metallic foil is contacted with mixed gases comprising molecular hydrogen formed by a chemical reaction in a hydrogen production zone. During the reaction, the molecular hydrogen is dissociated and passed as ionic hydrogen to the other side of the metallic foil from which it is withdrawn, thereby removing hydrogen from the hydrogen production zone. The concept of the '485 patent above is restricted to the use of a metal foil as the hydrogen separator. Foil separators have been proven to be difficult to achieve in practice. For example, they do not provide for a reliable structure which can operate for a reasonable time at high efficiencies.

OBJECTS AND SUMMARY OF THE INVENTION

Accordingly, an object of the present invention is to overcome the drawbacks and limitations of the prior art.

Another object of the present invention is to provide a membrane layer suitable for use in an electrochemical autothermal reformer.

Yet another object of the present invention is to provide an electrochemical autothermal reformer which is reliable and efficient.

The membrane layer of the present invention is a composite of ceramic and metallic components. It requires a mechanical support in the form of a reticulated alumina monolith preferably with a pore density of 80 pores per inch and an average pore size of about 250 micrometers. The entire monolith is catalyzed with a noble metal such as platinum to enhance the partial oxidation, shift and steam reforming processes. A layer of alumina ($Al_2O_3$) ceramic substrate with a theoretical pore size of 2 micrometers at a thickness of about 0.008" is formed over the monolith. A suitable thickness range for the substrate is from about 0.005" to 0.010". An electrochemical cell—a thin solid oxide layer, such as cerium oxide or tungsten oxide used to selectively transport both protonic hydrogen and associated electrons from the monolith side of the electrochemical autothermal reformer to the anode side of the reactor is formed over the alumina substrate. The function of this layer is to support a thin ceramic electrolyte cell which could not be supported by the monolith. A suitable thickness for the oxide layer is from about 4 to 8 microns, with a 6 micron layer providing satisfactory results.

A thin, non-continuous layer of catalyst, such as platinum, is deposited on both sides of the electrochemical cell to promote the dissociation of molecular hydrogen to protons and electrons on the anode side and recombination of protonic hydrogen and associated electrons to molecular hydrogen on the cathode side of the electrochemical cell. The catalyst layer may be up to about 100 Å thick with a layer of about 25 Å providing satisfactory results.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figures 1, 2:
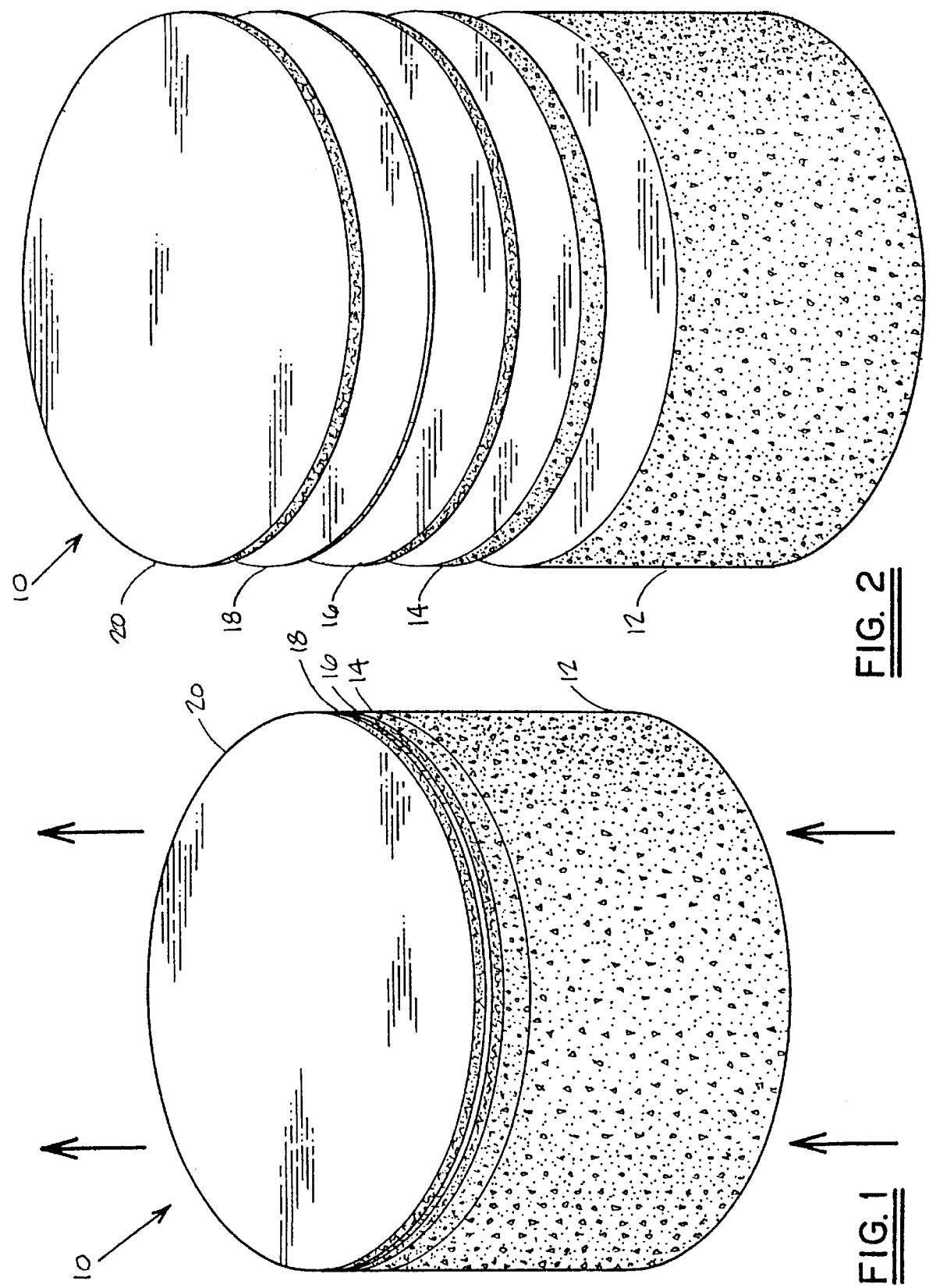
FIG. 1 is an isometric view of the membrane layer of the present invention.
FIG. 2 is an exploded view (or blow up) of the membrane layer shown in FIG. 1.

Referring to FIG. 1, a separator membrane suitable for use in the present invention is shown. A separator membrane layer 10 includes a monolith catalyst support 12 which is overlaid with an alumina ($Al_2O_3$) substrate 14 which provides a gas permeable support layer for a metal oxide membrane or mixed ion conductor layer 18. The metal oxide layer 18 is sandwiched between catalyst layers 16 and 20, respectively. Catalyst layer 16 functions to promote the dissociation of $H_2$ to $2H_+$ and $2e^-$ (or dissociation of hydrogen molecule to protons and electrons) while catalyst layer 20 functions to promote the recombination of $2H^+ + 2e^-$ to $H_2$. The arrow at the bottom on FIG. 1 indicates the direction of gas flow through the membrane, while the arrow at the top indicates the removal of hydrogen from the production zone through catalyst layer 20.

The following example illustrates one embodiment of a process for making a castable alumina substrate layer for use in the present invention.

EXAMPLE 1

Material is purchased from Cotronics Corporation (part number Rescor 780 Liquid Alumina; 3379 Shore Parkway; Brooklyn, N.Y. 11235) as a two component system. The components are alumina powder and liquid activator. The liquid activator is a water based alumina colloid solution.

Step 1: The powder is sifted through a screen so that a particle no larger than 0.009" in diameter will pass through the screen. The resultant powder is then sifted again through a size 86 polyester screen. This second sifting step ensures that the alumina particles will pass through the screen during the actual silk screen application process.

Step 2: The sifted material is then mixed in the required 100 parts powder to 22–26 parts activator and degassed in a 29" Hg vacuum.

Step 3: A stainless steel plate is prepared by covering it with a sheet of fine pore paper. The paper is pre-soaked with water and stretched to remove any large wrinkles. The pre-soaking procedure prevents the capillary action of the examination paper from pulling the activator away from the alumina powder.

Step 4: A number 86 polyester screen is laid down over the pre-soaked, stretched medical examination paper and the mixed alumina poured on top of the screen. A silk screen squeegee is used to pull the alumina over the screen and force it through the mesh and onto the pre-soaked medical examination paper (for a uniform layer, multiple passes may be required). The diameter of the threads that make up the screen control the theoretical thickness of the layer. A number 86 polyester silk screen has a thread diameter of 100 micrometers or slightly under 0.008".

Step 5: Since the medical paper can be easily handled with the alumina layer in the uncured state, it is lifted off of the platen and wrapped around the monolith. Pressure is then gently applied to promote adhesion of the alumina layer to the monolith. The alumina layer (with paper still attached) on the monolith is then allowed to cure for at least 24 hours. During the room temperature cure, light, uniform pressure is applied over the area of alumina application to prevent warpage during drying.

Step 6: After the 24 hour room temperature cure, the monolith with the cured alumina layer (with paper still attached) is placed in a furnace and ramped up to 100° C. for 2 hours to drive off any surrounding water. The light, uniform pressure applied over the entire alumina area (mentioned in Step 5) is applied throughout the elevated temperature post-cure process to minimize warpage.

Step 7: After 2 hours at 110° C., the furnace is ramped up to 250° C. and held for 1 hour to burn off the medical paper.

Step 8: After the medical paper burn-off, the furnace temperature is increased to 950° C. and held there for 2 hours to impart extra strength to the castable alumina.

Step 9: The entire part is then allowed to slowly cool down to room temperature over a 24-hour period.

Step 10: The cooled monolith with substrate layer part is then removed from the furnace and excess ash from the medical paper burn-off process is removed by light brushing or compressed air. The entire process results in a near uniform layer of porous alumina with a thickness of approximately 0.008".

EXAMPLE 2

The formation of the electrochemical cell in the form of a thin tungsten oxide layer ($WO_3$) is carried out by conventional RF sputtering. The oxide layer may also be formed by conventional techniques known to the art such as chemical vapor deposition, spin coating and dip coating.

The formation of this non-continuous layers of catalyst material on both sides of the electrolyte layer is carried out by depositing platinum layer 16 on the alumina substrate 14 by conventional RF puttering and then by sputtering the electrolyte layer 18 on top of the catalyst layer 16. Finally, a catalyst layer 20 is sputtered on top of the electrolyte layer 18.

Figure 3:
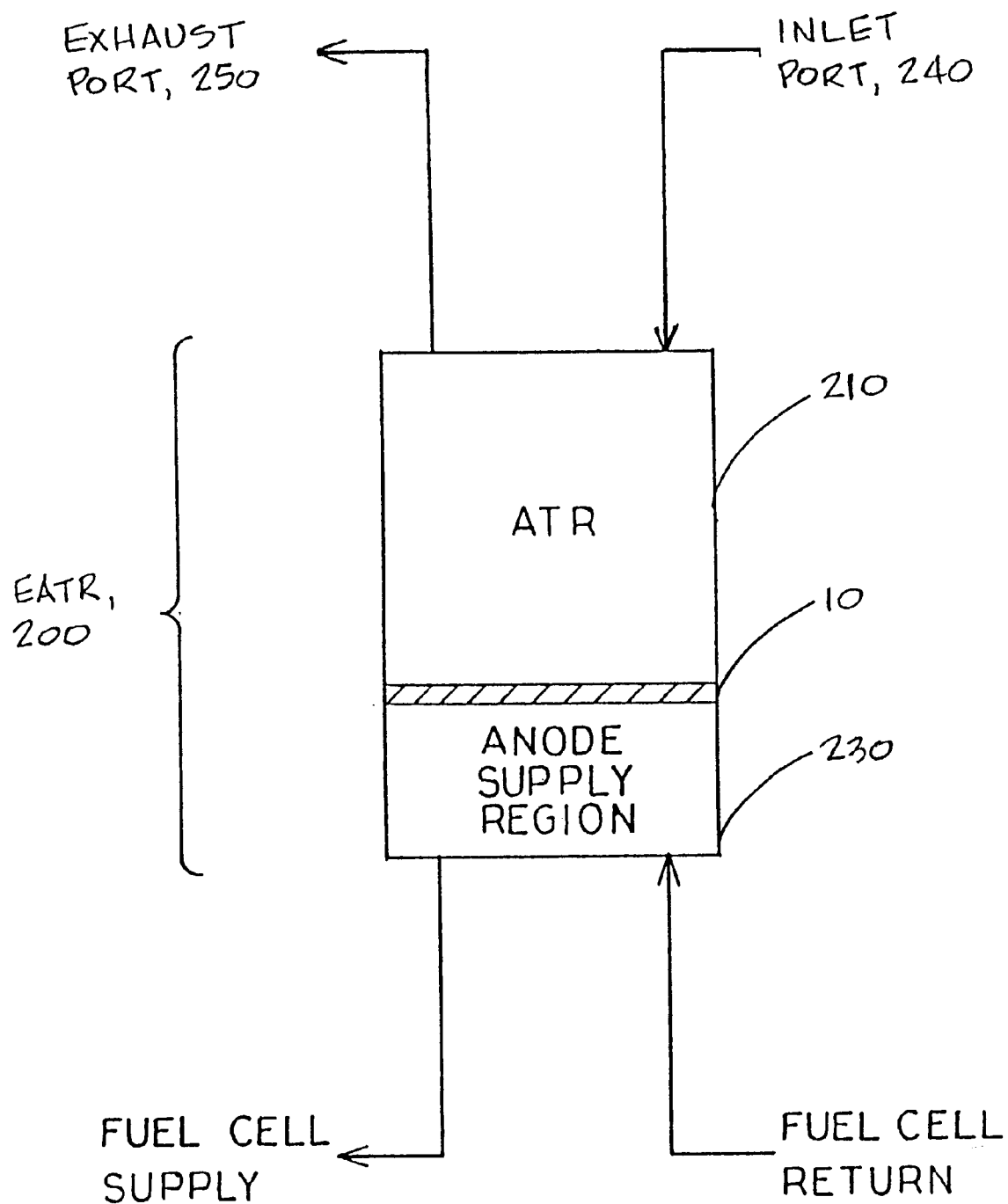
FIG. 3 is an electrochemical autothermal reformer employing the membrane layer of FIG. 1.

Referring to FIG. 3, an EATR (electrochemical autothermal reformer) 200 includes an ATR (autothermal reformer) 210 joined to a hydrogen gas space or anode supply region 230 by membrane layer 10. A fuel containing molecular hydrogen, such as a hydrocarbon or ammonia, enters ATR 210 through an inlet 240. Membrane layer 10 promotes dissociation of the hydrogen in ATR 210 as long as the partial pressure of the hydrogen in ATR 210 is greater than the partial pressure of the hydrogen in the hydrogen gas space or anode supply region 230. Reformed fuel or reformate or reaction products from the fuel reformer, ATR 210, less the hydrogen transferred through the membrane layer is exhausted through an exhaust port 250 and burned.

Either the reformer side of EATR 200, i.e., ATR 210, is pressurized or the hydrogen side, i.e., anode supply region 230, is eluted with a gas or vapor such as nitrogen or water. One method of ensuring that the hydrogen partial pressure in anode supply region 230 is lower than the hydrogen partial pressure in ATR 210 is disclosed in a copending application filed concurrently herewith entitled "FUEL CELL POWER PLANT WITH ELECTROCHEMICAL AUTOTHERMAL REFORMER" (Attorney Docket No. 269-007) and incorporated herein by reference.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electrochemical autothermal reformer, comprising:
   an autothermal reformer region;
   an anode supply region; and
   a composite membrane layer separating said autothermal reformer region and said anode supply region, said composite membrane layer including:
   (a) a stable porous ceramic support member;
   (b) a gas permeable ceramic substrate layer overlaying said support member;
   (c) a first particulate metallic catalyst layer overlaying said substrate layer;
   (d) a non-gas permeable metal oxide layer overlaying said first catalyst layer; and
   (e) a second particulate metallic catalyst layer overlaying said metal oxide layer.

* * * * *